United States Patent
Nishizawa

(10) Patent No.: US 7,173,720 B2
(45) Date of Patent: Feb. 6, 2007

(54) IMAGE FORMING APPARATUS WITH POWER SAVING CHARACTERISTICS

(75) Inventor: Akinori Nishizawa, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1162 days.

(21) Appl. No.: 09/848,086

(22) Filed: May 2, 2001

(65) Prior Publication Data

US 2001/0048532 A1  Dec. 6, 2001

(30) Foreign Application Priority Data

May 29, 2000  (JP)  .............. 2000-158323

(51) Int. Cl.
*G06F 15/00* (2006.01)

(52) U.S. Cl. ............. 358/1.14; 358/1.15; 399/89; 399/88; 347/5

(58) Field of Classification Search .......... 358/1.14, 358/1.15; 399/88, 89; 347/5; 363/97
See application file for complete search history.

(56) References Cited

U.S. PATENT DOCUMENTS 5,325,209 A * 6/1994 Manabe ............... 358/437
5,760,494 A * 6/1998 Takeda ............... 307/39
6,097,616 A * 8/2000 Iwasaki ............... 363/97

FOREIGN PATENT DOCUMENTS

JP  09-117136  5/1997
JP  10-028376  1/1998

\* cited by examiner

*Primary Examiner*—Kimberly Williams
*Assistant Examiner*—Andrew Lam
(74) *Attorney, Agent, or Firm*—Hogan & Hartson LLP

(57) ABSTRACT

An image forming device that uses a power transformer (T) such that no action delay and performance degradation/malfunction occur even in a power save mode, thereby achieving high energy efficiency. Circuits (2, 3, 4) of the image forming device are divided into to two blocks (A, B), and the power transformer (T) has two sets of windings (TA, TB), one for one of the blocks (A) that always needs power feeding and one for the other block (B) that needs power when necessary. Switches (SW) are provided on lines (L1 to L5) extending from the latter block (B) such that these switches are opened to interrupt power supply when the device is brought into the power save mode.

12 Claims, 3 Drawing Sheets

IMAGE FORMING APPARATUS WITH POWER SAVING CHARACTERISTICS

CROSS REFERENCES TO RELATED APPLICATIONS

This application claims priority under 35 USC 119 of Japanese Patent Application No. 2000-158323 filed in JPO on May 29, 2000, the entire disclosure of which is incorporated herein by reference.

BACKGROUND OF THE INVENTION

1. Field of the Invention

The present invention generally relates to an image forming apparatus such as facsimile machine having a power save mode to suppress power consumption.

2. Description of the Related Art

Recent image forming apparatus such as facsimile machines, photocopiers, printers widely utilized in offices have a power save mode that brings the apparatus into a power save condition to suppress power consumption if the apparatus is not operated for a predetermined period.

Such image forming apparatus has two blocks of processing circuits, which are grouped by their functions and roles. One block consists of processing circuits that are operated only when necessary, and the other block consists of processing circuits that are always operated. The former block of processing circuits is brought into the power save mode if a non-use condition continues over a predetermined period.

SUMMARY OF THE INVENTION

The present invention is directed to an image forming apparatus that takes voltage from an external commercial power source, uses a power transformer to cause the power source voltage to drop and use it for the apparatus, and an object of the present invention is to provide an image forming apparatus that has an improved power save mode and high reliability.

According to one aspect of the present invention, there is provided an image forming apparatus including a plurality of processing circuits categorized into first and second blocks with respect to respective functions of the circuits, a power transformer having a plurality of secondary windings, a first power supply unit for always feeding DC current to the first block of processing circuits from at least one of the secondary windings, a second power supply unit for feeding DC current to the second block of processing circuits from the seconding windings other than the above-mentioned at least one of the secondary windings, at least one switch for interrupting the DC current between the secondary windings and the second block of processing circuits, and a control unit for controlling the respective switch such that the DC current from the secondary windings to the second block of processing circuits is interrupted in a power save mode and the DC current is fed to the second block of processing circuits from the secondary windings in a normal mode.

The control unit may be operated with the DC current from the first power supply. The image forming apparatus may further include a voltage converting circuit for converting DC voltage of the first power supply unit to DC voltage of another level such that the DC voltage of another level is fed to the second block of processing circuits. The second block of processing circuits may include an image processing circuit, a printing unit, an image scanning unit and a communication control unit, and the DC current may be fed to the second block of processing circuits from the voltage converting circuit in the power save mode. The voltage converting circuit may be a DC to DC converter or a three-terminal regulator.

Additional objects, aspects, benefits and advantages of the present invention will become apparent to those skilled in the art to which the present invention pertains from the subsequent detailed description and the appended claims, taken in conjunction with the accompanying drawings.

DETAILED DESCRIPTION OF THE INVENTION

Embodiments of the present invention will now be described in reference to the accompanying drawings.

Figure 1:
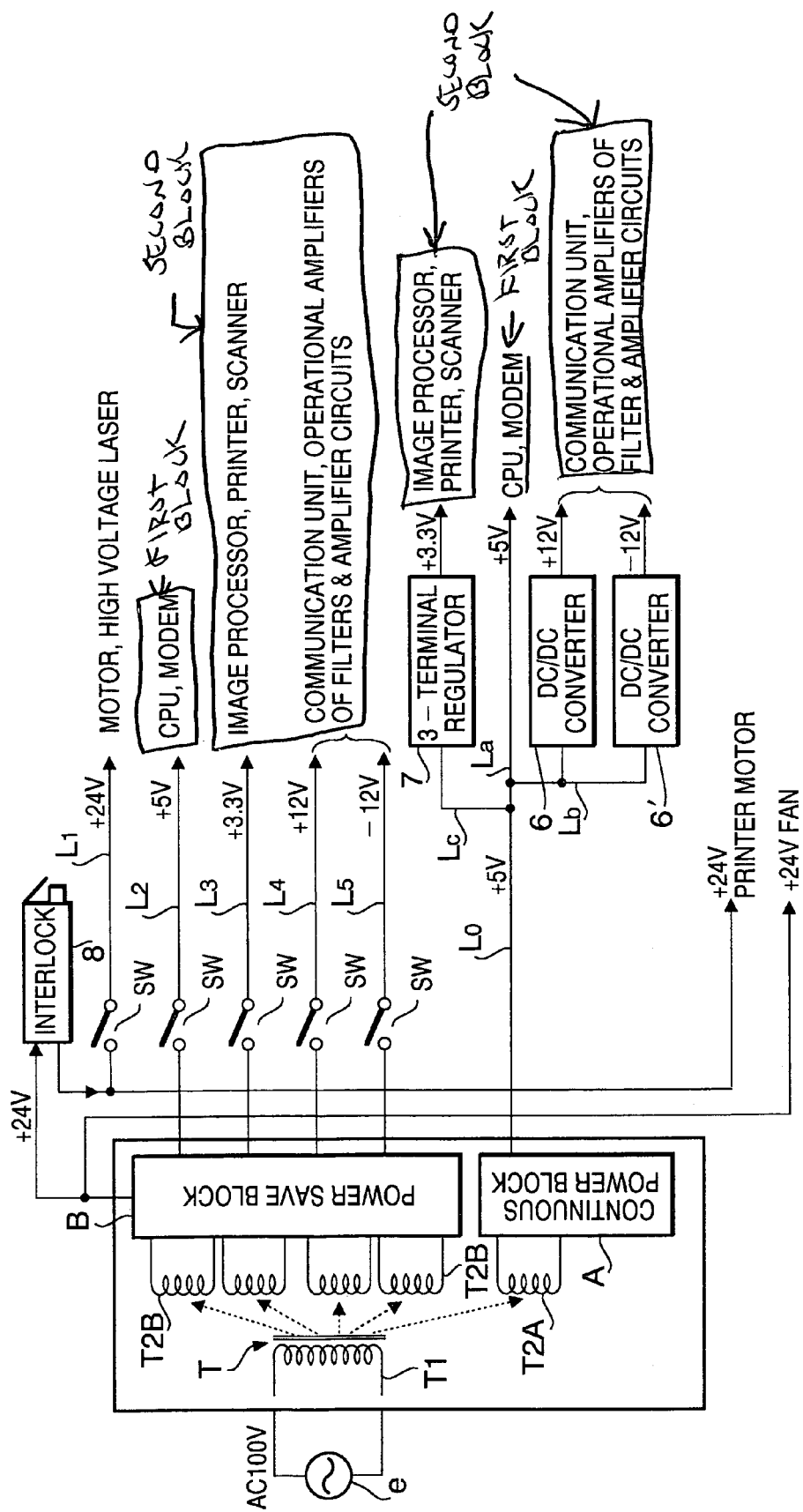
FIG. 1 is a block diagram showing major elements of an image forming apparatus according to the present invention.

Referring to FIG. 1, illustrated are a continuous power block and a power save block of an image forming apparatus of the present invention. The image forming apparatus may be a facsimile machine.

The illustrated image forming apparatus takes a commercial power source "e", which is an AC current provided from an remote place, causes it to drop through a power transformer T, and feeds it in the form of DC current to respective processing circuits of the apparatus through a power source block A for continuous power supply and another power source block B for power saving. The AC commercial power source "e" is supplied from a primary winding T1 of the power transformer T to a plurality of secondary windings T2A and T2B of the blocks A and B, and this AC power source is converted to DC current by a rectifier (not shown) before it is transmitted to the respective processing circuits.

The continuous power source block A has a line Lo extending therefrom. This line Lo becomes a signal processor power source line La to feed power to CPU and modems in a signal processor. The line Lo is also branched to an image processor line Lb and a communication unit line Lc. The line Lb is connected to DC/DC converters 6 and 6', and the line Lc is connected to a three-terminal regulator 7. In this manner, even if the apparatus is in the power save mode, sufficient power is fed to particular processing circuits, e.g., image processor and communication unit, such that these processing circuits can perform given jobs. It should be noted that more than one line may extend from the continuous power block A.

In the DC/DC converters 6 and 6', the DC power fed from the line Lo (+5V) is shifted to a level (e.g., +12V and −12V) required by operational amplifiers (OPs) used in a filter and amplifier of the communication unit. In the three-terminal regulator 7, the DC power of the line Lo is further lowered to a level (e.g., +3.3V) required by the image processor, image scanner and printer.

On the other hand, the power save block B has a plurality of separately-extending power source lines L1 to L5, each line being dedicated to a particular group of processing circuits having similar functions such that a particular value of voltage is fed to that group. A plurality of open-close switches SW are provided on these lines L1 to L5. It should be noted that more than five lines may extend from the power save block B.

In the illustrated example, the line L1 feeds 24V to a motor of a photosensitive drum and a laser driver, the line L2 feeds 5V to CPU and modem, the line L3 feeds 3.3V to the image processor, printer and image scanner, and the lines L4 and L5 feed 12V and −12V to the operational amplifiers in the filter and amplifier circuits of the communication unit.

An interlock switch 8 is provided for detecting whether an apparatus cover is opened (e.g., when a maintenance work is conducted), and interrupting the power supply to the motor, high voltage power supply and laser scanner for safety. When the interlock switch 8 is turned on, the 24V power to a printer motor is also stopped.

Figure 2:
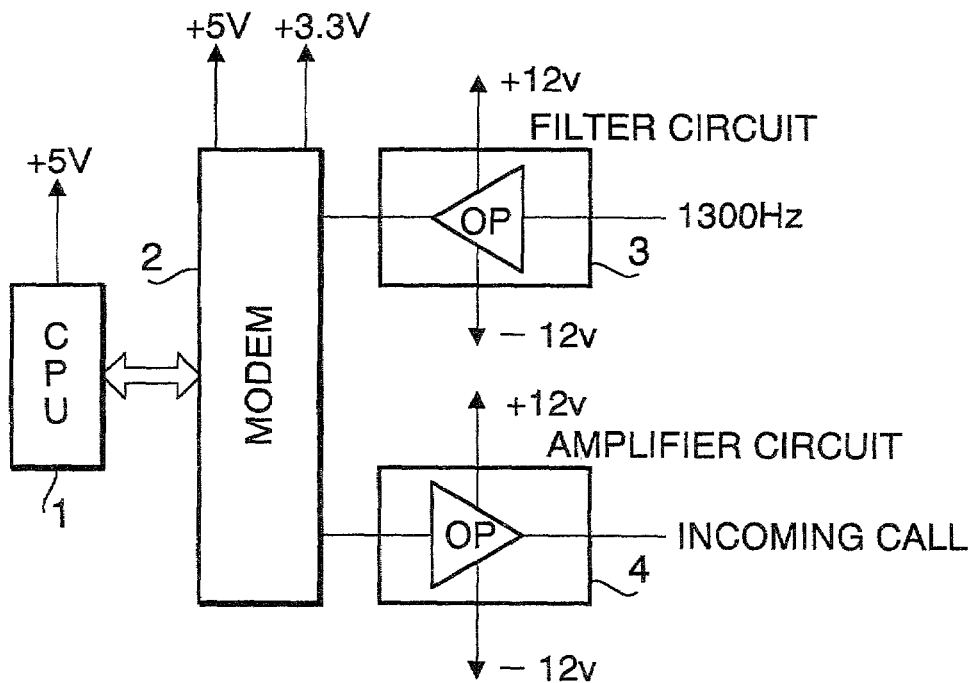
FIG. 2 is a block diagram showing part of a signal processor and a communication unit used in the image forming apparatus shown in FIG. 1.

Referring to FIG. 2, illustrated is a schematic diagram of the signal processor and communication unit, both of which are fed the power from the block A. The line Lo feeds DC 5V to CPU 1 of the signal processor and a modem 2 of the communication control circuit. The filter circuit 3 in the communication unit and the operational amplifier of the amplifying circuit 4 have 12V and −12V from the DC/DC converters 6 and 6'.

Figure 3:
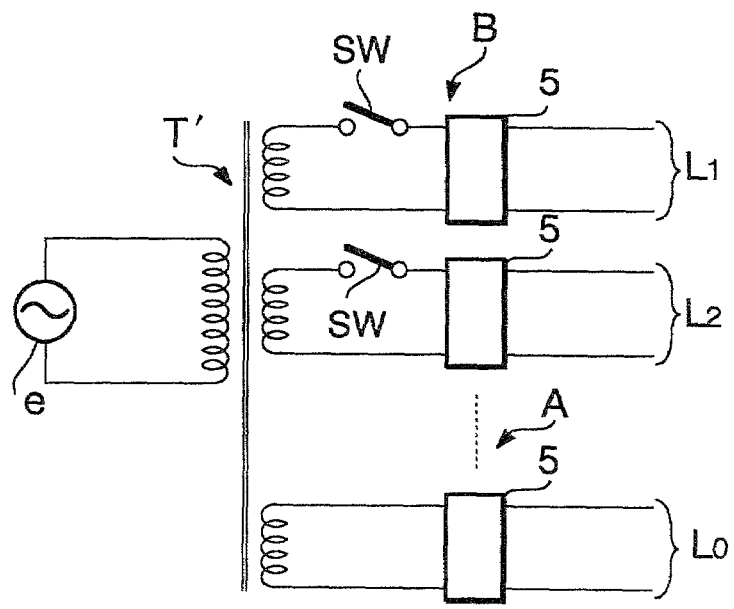
FIG. 3 illustrates a first modification made to the embodiment shown in FIG. 1.
Figure 4:
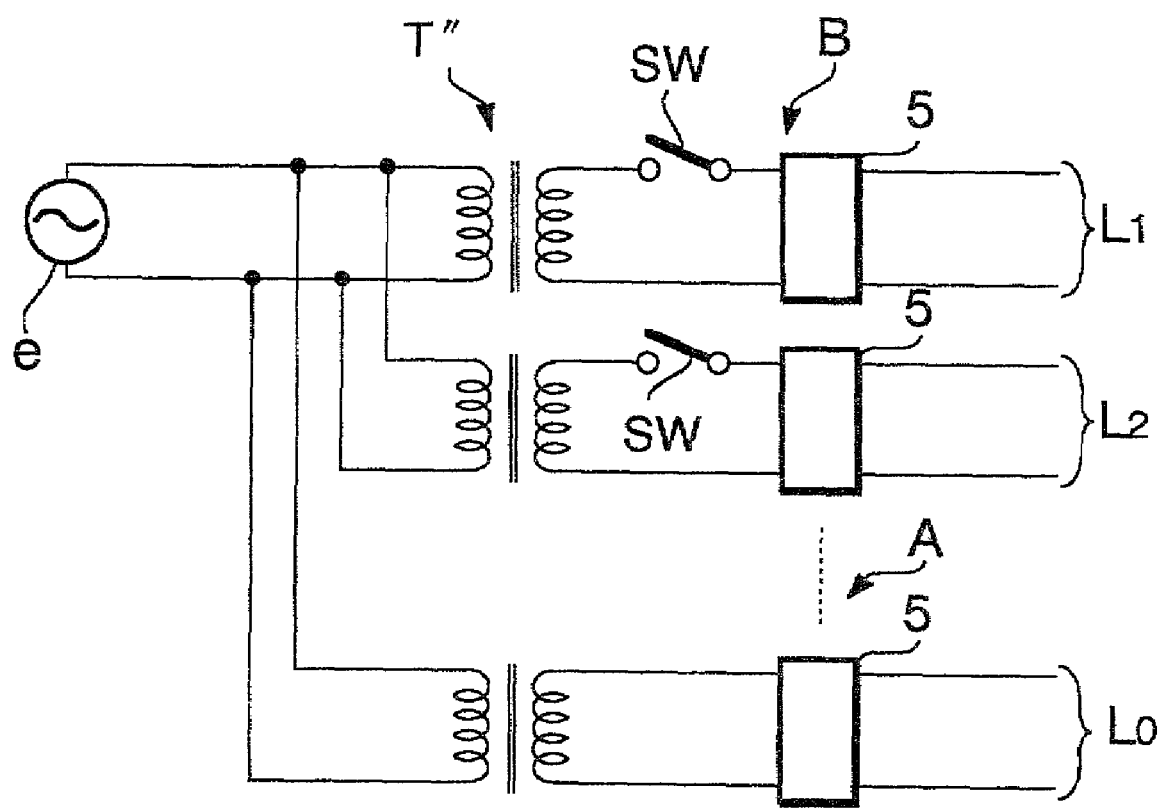
FIG. 4 illustrates another modification.

The present invention is not limited to the illustrated embodiment, and FIGS. 3 and 4 illustrate modifications. The power transformer T' of FIG. 3 has a single primary winding and a plurality of secondary windings. The power transformer T" of FIG. 4 has a plurality of primary windings and a plurality of secondary windings.

In each of these drawings, the commercial power source "e" is fed to the primary side, the block A does not have an open-close switch, the lines L1 to Ln extending from the block B have open-close switches SW respectively, and all the lines L1 to Lo of the blocks A and B have AC/DC converters 5 to convert AC power source induced at the secondary side of the power transformer T', T" to DC power source. Since the switches SW are located upstream of the AC/DC converters 5 to interrupt the power supply, energy efficient is further improved.

A fundamental operation of the image forming apparatus will now be described.

When the apparatus is in a normal mode, the signal processor detects such a condition and closes the switches SW on all the lines L1 to Ln of the block B so that the power is supplied to the respective processing circuits. When the apparatus is switched to the power save mode, the signal processor opens all the switches SW to interrupt the power supply. In this mode, however, the other block A feeds the power to the signal processor, image processor, printer, image scanner and communication unit. Accordingly, when the signal processor detects an instruction command such as execution of facsimile data reception, the power is supplied to relevant circuits such that they can carry out necessary jobs.

What is claimed is:

1. An image forming apparatus comprising: a plurality of processing circuits categorized into first and second blocks with respect to respective functions of the plurality of circuits; a power transformer having a plurality of secondary winding; a first power supply unit for always feeding DC current to the first block of processing circuits from at least one of the plurality of secondary windings; a second power supply unit for feeding DC current to the second block of processing circuits from the plurality of secondary windings other than the at least one of the plurality of secondary windings; at least one switch located between the plurality of secondary windings and the second block of processing circuits for interruption of power supply to the second block of processing circuits; a control unit for controlling the respective switch such that the DC current from the secondary windings to the second block of processing circuits is interrupted in a power save mode and the DC current is fed to the second block of processing circuits from the secondary windings in a normal mode; and a voltage converting circuit for converting DC voltage of the first power supply unit to DC voltage of another level such that the DC voltage of another level is fed to the second block processing circuits in the power save mode.

2. The image forming apparatus according to claim 1, wherein the control unit is operated with the DC current from the first power supply.

3. The image forming apparatus according to claim 1, wherein the second block of processing circuits includes an image processing circuit, a printing unit, an image scanning unit and a communication control unit, and the DC current is fed to the second block of processing circuits from the voltage converting circuit in the power save mode.

4. The image forming apparatus according to claim 1, wherein the voltage converting circuit is a DC to DC converter.

5. The image forming apparatus according to claim 1, wherein the voltage converting circuit is a three-terminal regulator.

6. The image forming apparatus according to claim 1, wherein the second block of processing circuits includes an image processing circuit, a printing unit, an image scanning unit and a communication control unit, and the DC current is fed to the second block of processing circuits in the normal mode.

7. An image forming apparatus comprising:
a plurality of processing means for performing a plurality of functions;
a plurality of power supply means for feeding DC current to the plurality of processing means based on AC current from a plurality of secondary windings of a power transformer;
switching means for interrupting AC current to be fed to the plurality of power supply means from the plurality of secondary windings in a power save mode except for at least one of the plurality of power supply means; and
voltage converting means for converting DC voltage fed from the at least one of the plurality of power supply means to another level of voltage such that the another level of DC voltage is fed to the respective processing means from the voltage converting means in the power save mode.

8. The image forming apparatus according to claim 7 further including control means for controlling the switching means, and wherein the control means is operated with DC current fed from the at least one of the plurality of power supply means.

9. The image forming apparatus according to claim 8, wherein the voltage converting means is a DC to DC converter.

10. The image forming apparatus according to claim 8, wherein the voltage converting means is a three terminal regulator.

11. The image forming apparatus according to claim 7, wherein the plurality of processing means includes image processing means, printing means, image scanning means and communication controlling means.

12. The image forming apparatus according to claim 7 further including means for determining whether an element of the image forming apparatus is moved, and for interrupting power supply to high voltage components among the plurality of processing means.

* * * * *